July 4, 1967 — R. L. CORBIN ET AL — 3,329,559
METHOD OF MAKING BATTERY SEPARATORS OF ALPHA CELLULOSE COATED WITH POLYETHYLENE
Original Filed April 10, 1961 — 4 Sheets-Sheet 1

RALPH L. CORBIN
RINE KRUGER
DONALD V. BADGLEY
INVENTORS

THEIR ATTORNEY

RALPH L. CORBIN
RINE KRUGER
DONALD V. BADGLEY
INVENTORS

THEIR ATTORNEY

United States Patent Office 3,329,559
Patented July 4, 1967

3,329,559
METHOD OF MAKING BATTERY SEPARATORS OF ALPHA CELLULOSE COATED WITH POLYETHYLENE
Ralph L. Corbin and Rine Kruger, Anderson, and Donald V. Badgley, Muncie, Ind., assignors to General Motors Corporation, Detroit, Mich., a corporation of Delaware
Continuation of application Ser. No. 102,044, Apr. 10, 1961. This application Apr. 8, 1966, Ser. No. 549,089
2 Claims. (Cl. 162—138)

This application is a continuation of application Ser. No. 102,044, filed Apr. 10, 1961, which in turn was a continuation-in-part of application Ser. No. 30,380, filed May 19, 1960, both now abandoned.

This invention relates to battery separators and is particularly concerned with plastic battery separators having good electrical characteristics, high strength and capable of bending without breaking and to a method for making said separators.

An object of this invention is to provide a battery separator formed from sintered, high density, linear polyethylene particles wherein each particle of polyethylene has a core of alpha cellulose and wherein the particles, when sintered together, form a microporous sheet having high strength and good electrical properties and substantially uniform thickness.

A further object of the invention is to provide such a separator with ribs that are embossed into the sheet and wherein the ribs have different dimensions at opposite sides of the sheet whereby separators in stacks are prevented from nesting one to the other.

A still further object of the invention is to provide a polyethylene battery separator which has improved physical and electrical characteristics over battery separators made from paper, microporous rubber and the like.

Another object is to provide a separator that is slightly compressible whereby a battery assembly including a plurality of said separators may be dimensioned so as to be a snug fit in a battery case.

A still further object of the invention is to provide a continuous method for making the separators as herein described.

Further objects and advantages of the present invention will be apparent from the following description, reference being had to the accompanying drawings wherein preferred embodiments of the present invention are clearly shown.

Figure 1:
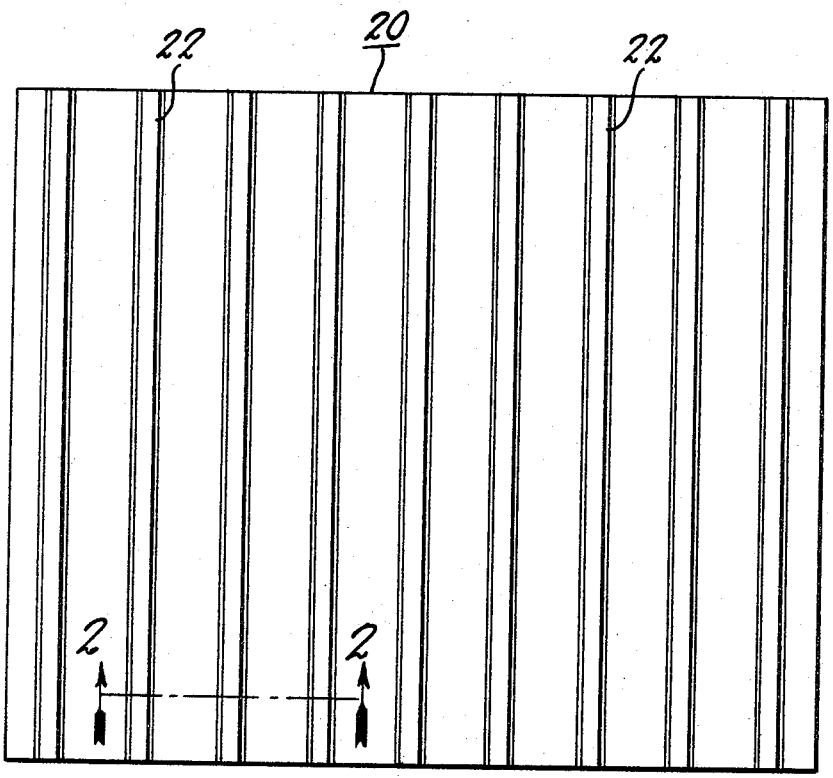
FIG. 1 is a plan view of a battery separator showing the embossed ribs thereon.
Figure 2:
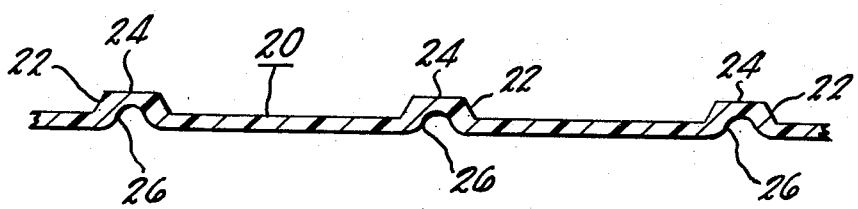
FIG. 2 is an enlarged section taken on line 2—2 of FIG. 1 showing the physical configuration of the ribs and separator.

Battery separators used to space the positive and negative plates of lead-acid batteries must be microporous in nature and yet must have relatively low electrical resistance. These separators should also be rugged and resistant to tear, chip and the like.

In the manufacture of storage batteries, the various plates and separators are generally assembled by use of manifolding machines wherein stacks of various elements are sequentially positioned one above the other to form a complete battery element having the desired number of positive and negative plates each separated by a separator. The mechanical handling of the various elements creates great difficulty if the separators are of a brittle nature and tend to crack, chip or tear.

In the past, a number of materials have been used for battery separators, most common of which was a wood separator. Microporous rubber separators have also come into extensive use due to their improved life over wood. Microporous rubber separtors, however, are expensive to make and have physical characteristics which cause some difficulty in the assembly thereof into a battery.

In recent years, paper separators have been offered to the trade wherein a paper sheet is impregnated with an acid resisting resin to form a relatively inexpensive separator. These paper separators, however, are quite brittle due to the resin impregnant which causes great difficulty in automatic stacking procedures since t he separators tend to chip and crack whenever they are bent slightly whereby completed cell groups in some cases fail to pass certain quality control tests. In almost every instance, a tear-down of the rejected group shows that one or more separators have been damaged. Furthermore, in use, these separators sometimes become fractured which permits excessive treeing between plates and, in general, reduces the efficiency of the battery.

Plastic separators made from sintered plastic particles have heretofore been of little value since these separators are quite difficult to control with respect to microporosity. The present invention is directed to an improved separator which has a uniform degree of microporosity, has high strength, is resistant to tear and chip, has excellent electrical characteristics and is compressible within limits to provide resiliency in a plate assembly including said separators.

Specifically, the separator to be described herein is made from polyethylene particles wherein each particle of polyethylene includes a core of alpha cellulose. These particles are sheeted out to form a mat in much the same manner that paper is formed and this mat is then sintered so that the polyethylene portion of the particles adheres together to form a microporous sheet. Control of the initial thickness of the mat, size of particles, percentage of polyethylene therein, etc., yields satisfactory control of mcroporosity and strength.

Polyethylene particles having cellulose cores may be made by several methods, one which comprises passing ethylene gas directly into a solution of alpha cellulose particles in a fluid vehicle and causing the ethylene to polymerize, in the presence of a catalyst, directly onto the surfaces of the cellulose particles. By controlling the initial size of the cellulose particles and the time of the reaction, it is possible to control size of the ultimate size of the coated particles and the thickness of the polyethylene covering.

Particles of this nature may also be made by following the teachings of application Ser. No. 852,991, assigned to the assignee of the present invention wherein polyethylene is dissolved in a solvent and is coated onto alpha cellulose particles, and thereafter, the solvent is eliminated to cause a polyethylene coating to be produced on the particles. It is to be understood that the particular method by which these particles are made forms no part of this invention. It should be pointed out, however, that it has been our observation that the polyethylene coating should be in the order of from 40% to 50% by weight of the material since greater percentages create control difficulties and raise the cost of the product while lesser quantities do not protect the alpha cellulose sufficiently against the battery acid. The polyethylene coating should also be of a linear nature and one of high density ranging in the order of .955 to .963 at 20° C.

The alpha cellulose particles or fibers have been found to produce more useful results if they are of medium length and fibers, upwards to 110 microns in length, are the most desirable. Shorter fibers, in the order of 45 microns, appear to create too much shrinkage during the subsequent sintering step of the process.

Cellulose coated with polyethylene of the type set forth heretofore may be formed into separators by any one of a number of methods, for example, by a batch process or by a preferred continuous process which will be described in detail hereinafter and which may briefly be described as follows. The polyethylene particles are suspended in a slurry in water and are deposited in a layer of the desired thickness upon a screen in a continuous manner. This sheet may be dried and is then sintered continuously. In general, sintering temperatures of around 300° F. to 330° F. for a period of from 2½ to 3 minutes produces a good separator of high strength and excellent flexibility.

Ribs may be embossed on the separators during or immediately after the sintering operation and this produces the best results since it is difficult, if not impossible, to produce the ribs on the unsintered sheet. The degree of pressure utilized during the embossing step is reflected in the apparent density of the separator which will run approximately eight to 8.5 grams per cubic inch with a calculated pore volume of about 68%, although the density may vary downwardly to 6.2 grams per cubic inch in some cases. To obtain these figures, an initial noncompacted thickness of the mat of about .100 of an inch is preferred, which during sintering and compression is reduced to about .026 inch.

In all past procedures with plastic separators, the ribs have been thicker than the remainder of the sheet resulting in varying densities over the sheet or separator. This causes differing strengths which results in cracking and tearing throughout the lower density sections. In the present design, we emboss the ribs directly into the sheet wherein the thickness of the ribs is substantially the same as the thickness of the remainder of the sheet. This gives more uniform density and results in more uniform strength and resistance toward tear.

Furthermore, a separator, as shown at 20 in FIG. 1, is provided with ribs 22 which have a flat top section 24 and a curved underside 26. The curve is formed so that as little difference in thickness as possible is noted. However, this design is of great importance since, as described heretofore, in automatic stackers used in the assembly of battery cell groups, it is highly desirable that the separators 20 do not nest one onto the other since it is difficult to remove them from the stack and, likewise, there are frequently two separators fed into the assembly machine rather than one. By having each rib of nonuniform configuration at the top and bottom, there is no tendency toward nesting so that the separators may be easily fed into the machine.

Separators made in accordance with the foregoing have excellent physical qualities which are compared in the following table to paper and rubber separators wherein all tests are run under the same test procedures and conditions:

|  | Polyethylene | Rubber | Paper |
| --- | --- | --- | --- |
| Izod, inch-pounds | 7.4 | 7.4 | 2.8 |
| Bend, degrees | 77 | 42 | 17 |
| Chip, grams | 10 | 2 | 5 |
| Tear, grams | 343 | 250 | 240 |
| Electrical Resistance: |  |  |  |
| 15 min., ohms/sq. in | .0211 | .04 | .025 |
| 24 hrs., ohms/sq. in | .0201 | .04 | .025 |

In the above table:

The Izod is a shearing impact test on a ½" x ½" specimen made up of sections of the web laminated together.

*Bend.*—In this test, a separator is bent around a ⅛" mandrel while holding one half of the separator in a fixed position. The test is made so that the break is perpendicular to the direction of the ribbing. The reading obtained is the number of degrees the separator is bent until a crack appears.

*Chip strength.*—Chip strength is the height that a 40 gram weight attached to a knife edge must fall to penetrate the edge of the separator web to a depth of ⅛".

*Tear strength.*—Tear strength is the number of grams of pull required to tear a separator in the direction of the ribbing.

In all of the above tests, separators having overall dimensions of 5²⁹⁄₃₂" x 5⁷⁄₃₂" with a web thickness of .026" were used which is the standard thickness for a rubber separator, the overall thickness being .066" with a density of about 8 grams per cubic inch and containing 45% by weight polyethylene separators made within the ranges noted.

In general, an electrical resistance of .040 ohm per square inch is satisfactory as noted by the widespread commercial success of microporous rubber separators. However, lower resistance is desirable if it may be obtained without sacrificing physical characteristics. The present polyethylene coated cellulose fiber separators may be made with extremely low electrical resistance as noted in the preceding table. However, for commercial separators, resistance up to .030 ohm per square inch are fully satisfactory and this figure is a maximum for the present separator.

From these figures, it is quite apparent that the separator of the present invention is superior to both rubber and paper as a commercial product. It compares favorably with the best figures for any physical or electrical characteristic shown by its competitors and is a great improvement in many physical respects to the competing types of separators. These improvements greatly reduce manufacturing costs since it has been found, when using paper separators, for instance, that scrap losses amount to as much as 12% of the total separators used whereas with rubber separators, this figure is 2.5%. In the present instance, a scrap loss of only .9% is noted. It is quite apparent from these figures that not only is the scrap reduced markedly but the cost of the operations are likewise reduced for, in many instances, these scrapped separators must be removed from assembled cell groups which requires considerable inspection to assure high quality products.

Polyethylene separators of the type described herein have another very useful and desirable advantage over rubber or paper separators in that the polyethylene separators are compressible. This means that, when the battery element is made up including the several pasted plates with separators therebetween, the stack-up width of the element may be slightly greater than the cell opening in the case whereby the element may be compressed as it is positioned in the case for greater stability. In this manner, the element does not vibrate within the battery during use thereof due to the resilient pressure maintained between the cell wall and the plates as caused by the springiness of the separators.

Neither rubber separators nor paper separators have this resiliency or compressibility factor and, therefore, the stack-up width of the plates and separators must be slightly less than the cell opening whereby the assembly is prone to vibrate within the battery when the battery is used in an automobile, for example, which tends to cause loss of active material from the plate.

Battery separators made in accordance with the present invention as described herein and having a thickness of web approximately .026" will have a compressibility at about 30 pounds applied over the entire surface of the separator and equal to approximately ¹⁄₁₀ of the thickness of the separator or .0026". This figure may be varied slightly by modifying the rib design.

In order to demonstrate the compressibility described herein, a stack of ten separators was arranged with steel plates between each separator to approximate the condition of the separators within a battery. Pressure was then applied on the top of the stack in varying amounts with the following results:

| Pressure, pounds | Distance Compressed (10 Separators) | |
|---|---|---|
| | Polyethylene-Embossed Rib, inch | Rubber, inch |
| 6 | 0 | 0 |
| 10 | .006 | 0 |
| 20 | .017 | 0 |
| 30 | .026 | .006 |
| 40 | .036 | .006 |
| 50 | .041 | .006 |
| 70 | .049 | .006 |

From this comparison, it will be seen that, as the pressure increased, the polyethylene separators were progressively compressed whereas the rubber separators showed no change in dimension after 30 pounds and showed no compressibility whatsoever up to that point.

Paper separators, being highly brittle, show little if any compressibility under the test conditions and, therefore, are not tabulated in the results. This compressibility factor is of major importance to the battery per se and, therefore, the use of the separators improves the overall life characteristics of the battery due to the snug fit of the elements within the cells.

Figure 3:
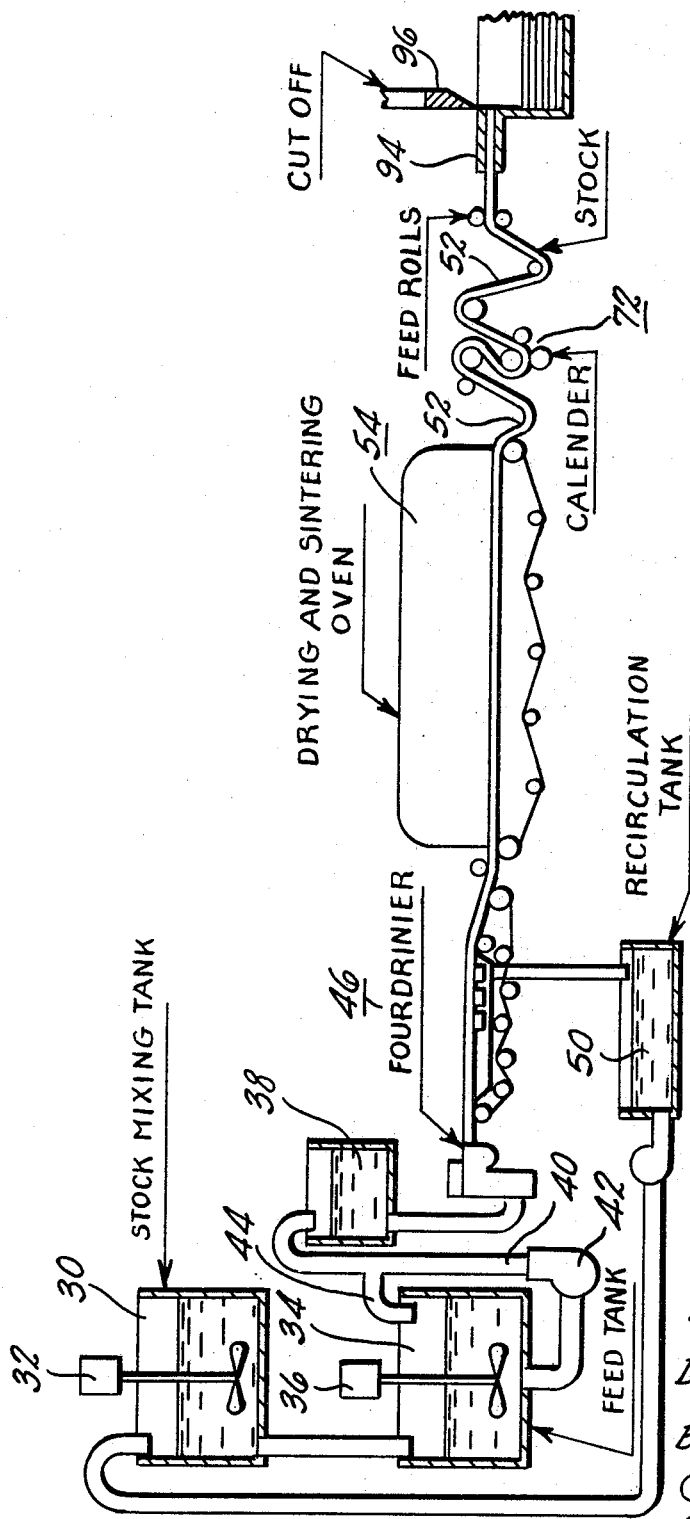
FIG. 3 shows diagrammatically a continuous production line capable of making the separtor as disclosed herein.

Describing the method specifically, reference is made to FIG. 3 which shows diagrammatically a continuous production line for making the separators heretofore disclosed. In this line 30 is a stock mixing tank wherein the polyethylene coated cellulose powder is mixed with water. In one specific embodiment of the invention, tank 30 is an eighty gallon tank equipped with a rotating agitator 32 that operates at approximately 1725 r.p.m. A water slurry of the polyethylene cellulose is made wherein the powder or particles make up about 3% by weight of the slurry on a dry sheet basis. To the water in the mixing tank is added a wetting agent in quantities of from .25% to 2.5% by volume with 1.25% by volume being preferred.

The wetting agent is specifically composed of one part by volume of Aerosol OT (dioxtyl sodium sulphosuccinate) and 2½ parts by volume of Surfonyl 104 (acetylenic glycol). The combination noted is preferred although either wetting agent alone will yield useful results. Another suitable wetting agent is "Victawet 12" (a water soluble medium chain alkyl phosphate) in the same quantities as above noted. These surfactants yield high dispersion of the powder without foaming which is of great importance if a sheet separator is to be made. Furthermore, the wetting agent or combination thereof is retained during the subsequent processing and is not destroyed by the sintering procedure to be described hereinafter whereby the finished separator includes sufficient wetting agent to permit good initial wetting in a storage battery. The separators utilizing this wetting agent have low ionic resistance and produce no foaming during battery charging. Furthermore, the wetting agent is tenacious after application and does not wash out during the normal procedures utilized in producing dry charge batteries. In this respect it can be termed a "leachproof" wetting agent system.

The slurry prepared in tank 30 is next run through a feed tank 34 which includes an agitator 36 operating at 1725 r.p.m. The feed tank is utilized as a supply from which the slurry may be pumped into a head box 38. This is accomplished through a feed system 40 including a pump 42 and a recirculating pipe 44 whereby through conventional control devices, not shown, the height or depth of the slurry in tank 38 is maintained uniform. The slurry in tank 38 next passes onto a Fourdrinier screen 46 which forms a portion of a standard Fourdrinier type machine similar to the machine used in the manufacture of paper. In the present instance the sheet formed is about 7 inches wide and the thickness adjusted by the flow of the slurry so that a sheet between .085 inch and .110 inch is formed. The water in the slurry is removed from the sheet by revolving the table rollers and vacuum which is controlled so that the sheeted stock reaches the screen 46 containing about 65% moisture by weight. The water drawn off on the Fourdrinier screen 46 is recaptured in the recirculation tank 50 and is again pumped into stock mixing tank to conserve the wetting agent system.

Figure 4:
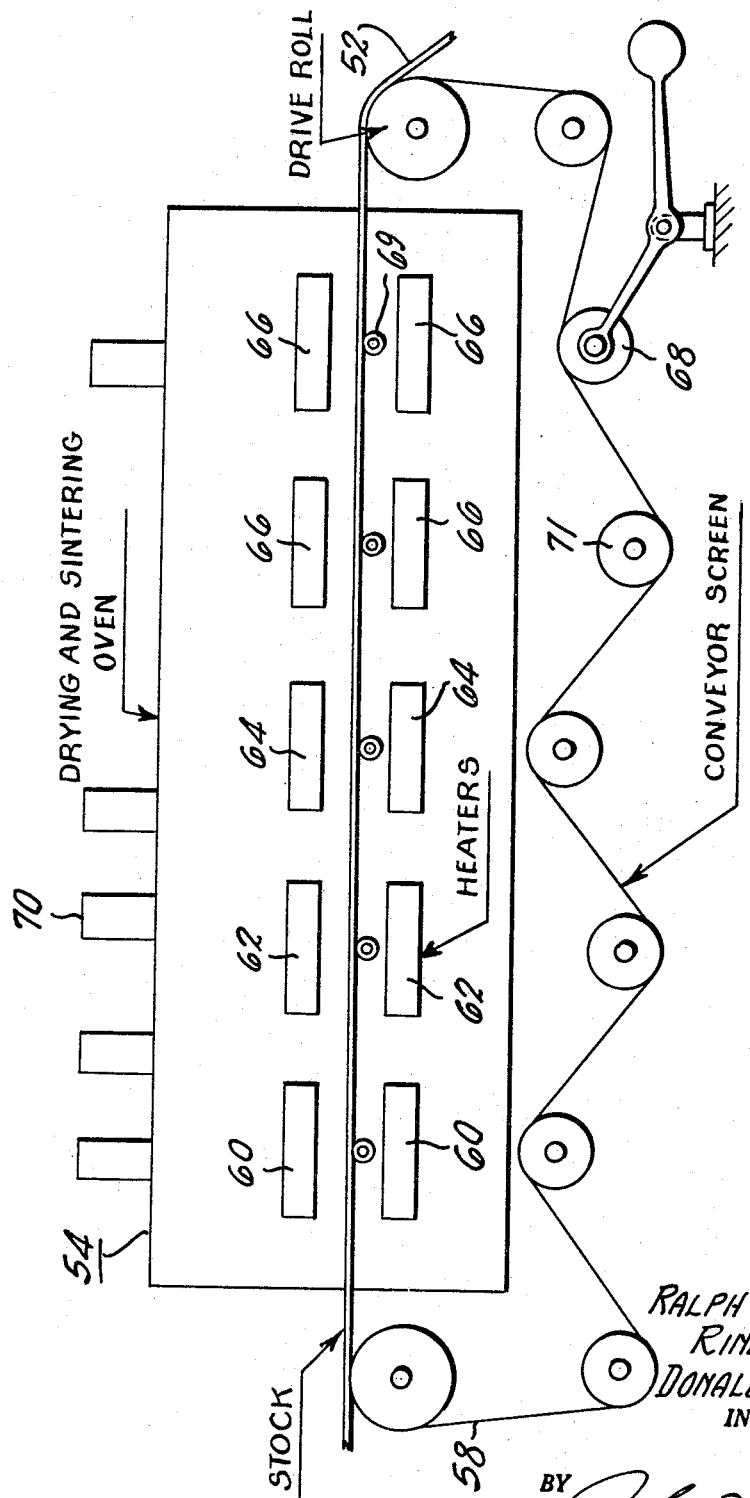
FIG. 4 is a diagrammatic view of the oven assembly used in the production line disclosed in FIG. 3.

The formed sheet from the Fourdrinier screen 46 is indicated at 52 and passes from the screen 46 into a drying and sintering oven 54. The oven 54 is shown in greater detail in FIG. 4 and comprises an endless belt 58 made of phosphor bronze in the form of a screen mesh. The belt 58 moves at about 5 feet per minute through the oven which is heated by a plurality of quartz rod radiant heaters 60 that are positioned above and below the belt 58. The oven is heated in five steps wherein the heaters 60 comprise the first step and maintain the first oven zone at a temperature of about 600° F. The heaters 62 which comprise the second step are maintained to provide a heating zone of 520° F. The heaters 64 provide a third step of heating at 350° F. while the heaters 66 comprise the final two steps which are maintained for controlled heating of from 300° F. to 330° F. Air movement is maintained at a minimum within the oven. During heating of the oven the phosphor bronze belt begins to elongate and this is compensated for by a counter-balance take-up at 68 which maintains the belt under uniform tension. The various guide rollers 69 and 71 maintain the belt in proper alignment.

The strip of polyethylene coated cellulose material 52 emerges from the oven at the right hand side thereof and should be at a temperature of at least 300° F. Temperatures below this figure will not properly sinter the material and temperatures much above 310° F. may cause a scorching. A radiation thermometer is preferably utilized to accurately measure the temperature of the strip although experience has shown that the appearance of the strip and the way that it contours are excellent guides for determining the temperature of the oven.

It should be pointed out here that when the process is started the oven should be brought up to heat by running previously sintered material through the oven which has been wet wherein sufficient material is run through for about ten minutes to bring the oven up to heat. In this manner there is no danger of excessive expansion of the belt which would otherwise occur if the wet material were not placed therein.

It will also be noted that the oven is vented by a plurality of stacks 70 to permit humidity to escape therefrom. It is also understood that in place of electric heaters other suitable heating means may be employed with similar results providing accurate control is maintained as heretofore set forth.

Figure 5:
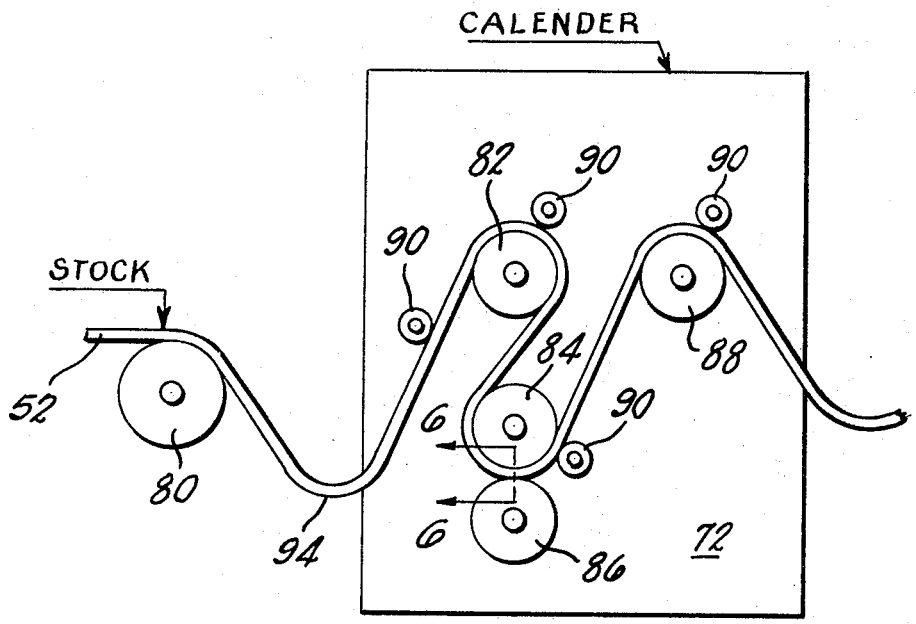
FIG. 5 is a view of the calender roll arrangement used for continuously contouring the sheet stock and FIG. 6 is a section taken on line 6—6 of FIG. 5 showing the surface configuration of the calender rolls.

After the strip 52 emerges from the oven it is passed through a calender assembly 72. These rolls are shown in detail in FIGS. 5 and 6 wherein the stock 52 is first supported upon a roller 80 and then passes over a roller 82 and then between the calender rollers 84 and 86, over roller 88 and out at the calender. Guide rollers 90 are provided to prevent misalignment of the stock. A loop 94 is formed in the sintered strip immediately prior to its entry in the calender roll, this prevents tearing of the strip and since the strip is hot as it approaches the rollers it is easily bent and embossed.

Figure 6:
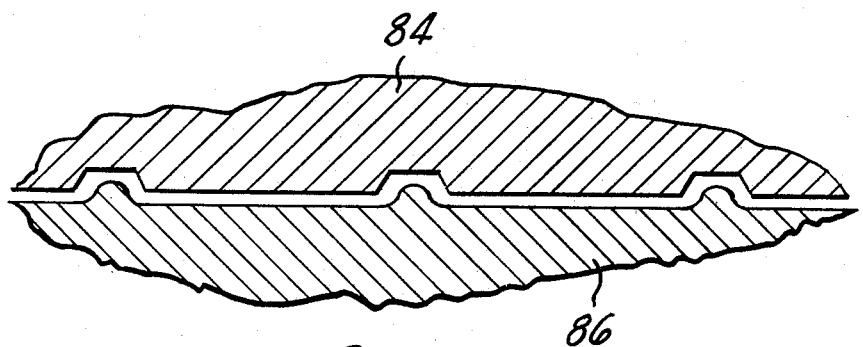

In FIG. 6 a cross section through the rollers 84 and 86 is shown wherein the specific embossing contour is noted and wherein the roller 84 includes flat bottom troughs thereon while the roller 86 includes rounded protuberances and ribs thereon. These rollers contour the strips so as to form separators as shown at 20 in FIG. 1 having the ribs shaped as noted at 22. After the strip 52 has been embossed it passes directly into a cutter 94, which has a blade 96 that operates each time sufficient stock passes therethrough to form a separator, to cut off the stock in lengths having the desired dimensions.

Calender rolls with their meshing ribs and grooves produce a separator having normal thickness of about .026 inch which is approximately 25% of the original thickness of the sheet. The rib height is about .006 inch. If desired the small roll 90 may include cutting edges at the sides thereof to cut the strip 52 to a desired width and offer a clean seared edge of the separator strip. This is effected since the calender rolls are polished chrome steel to prevent sticking and are heated to 300° F. throughout the operation which further sinters the material and sears the edges when a cut is made by the roller 90. The calender rollers are driven and are maintained at the speed of the oven belt normally to pass about 5 feet per minute of stock. The final sintering is therefore accomplished on the calender rolls during the contouring of the separator strip.

The cutoff at 96 may be controlled by any suitable means such as a photo electric cell which will cause the knife to reciprocate periodically as the stock passes thereunder.

The process disclosed herein may utilize any size equipment and the specific equipment set forth forms only one embodiment for operating the method, it being understood that wide variations in procedure may be followed as is well known in the art. The important factors in the present method, however, are specifically related to the progressive drying and sintering in the oven 54 and to the final sintering and contouring on the roll assembly 72. These factors appear to be of great importance since sheet separators can only be obtained when the controls are maintained within close limits. For example, it has been found that where the sintering is completed in the oven and the rollers are merely heated by conduction, that unsatisfactory separators are produced. It has been found that if the material on the belt is heated uniformly throughout the length of the oven that the sintering is incomplete and fragile separators are formed. It appears to be of utmost importance that the temperature within the oven start high and be progressively reduced with the sintering thereof whereby the moisture in the strip or sheet is progressively evaporated in zones of decreasing temperature and wherein the sheet is then sintered under critically controlled conditions and is provided its final sintering during the contouring thereof. This final sintering of the contour rollers apparently heals any tears or breaks which occur in the separator strip during contouring whereby strong flexible material is obtained that is highly advantageous for its final use.

While the embodiments of the present invention as herein disclosed constitute preferred forms, it is to be understood that other forms might be adopted.

What is claimed is as follows:

1. In a continuous method for making battery separators comprising, polyethylene particulate material wherein each particle includes a core of alpha cellulose and wherein the separator has high strength, bend and tear resistance and has an apparent density in the finished state of 6.2 to 8.5 grams per cubic inch, the steps comprising, continuously sheeting said polyethylene particles from a slurry thereof, progressively sintering the sheet so made at temperatures and under conditions sufficient to heat the particles to a surface temperature in the order of 300° F. to cause at least partial sintering of the polyethylene material without scorching the sheet, progressively compacting the partially sintered sheet between pressure rolls and bringing the thickness thereof to the desired thickness and simultaneously completing the sintering operation, while cutting the sheet to the desired width and searing the cut edges due to the heat of the rolls, and then cutting the separator to the desired length from said sintered strip of sheet material.

2. The method as claimed in claim 1 wherein a wetting agent is incorporated in the slurry which wetting agent is unaffected by the sintering temperatures and remains in effective condition within the interstices of the finished separators.

References Cited
UNITED STATES PATENTS
2,104,996  1/1938  Ives _____ 162—117
2,658,828  11/1953  Pattilloch _____ 162—169
3,084,091  4/1963  Volkman _____ 162—168 X

OTHER REFERENCES
Oliner, The Properties of Flexible Impregnated Sheets, Paper Trade Journal, vol. 125, No. 7, pages 55–62, Aug. 14, 1947.

DONALL H. SYLVESTER, *Primary Examiner.*

S. LEON BASHORE, *Examiner.*

H. CAINE, *Assistant Examiner.*